United States Patent [19]

Lin et al.

[11] Patent Number: 5,328,645
[45] Date of Patent: Jul. 12, 1994

[54] GEL PROMOTERS FOR SILICA SOLS

[75] Inventors: Chia-Cheng Lin, Hampton Township, Allegheny County; John D. Basil, Pittsburgh, both of Pa.

[73] Assignee: PPG Industries, Inc., Pittsburgh, Pa.

[21] Appl. No.: 293,405

[22] Filed: Jan. 4, 1989

[51] Int. Cl.$^5$ ............................................. B01J 13/00
[52] U.S. Cl. .................................. 252/315.6; 501/12; 106/287.34
[58] Field of Search ......................... 252/313.2, 315.6; 501/12; 106/287.34

[56] References Cited

U.S. PATENT DOCUMENTS

| | | | |
|---|---|---|---|
| 4,166,753 | 9/1979 | Emblem et al. | 106/308 |
| 4,197,230 | 4/1980 | Baney et al. | 260/29.2 M |
| 4,609,487 | 9/1986 | Burkhardt et al. | 252/315.6 X |
| 4,613,451 | 9/1986 | Chang et al. | 252/315.6 X |
| 4,613,454 | 9/1986 | Keiser | 252/313.2 |
| 4,767,433 | 8/1988 | Iura et al. | 501/12 X |
| 4,806,328 | 2/1989 | Yan Lierop et al. | 501/12 X |

OTHER PUBLICATIONS

"The Processing and Characterization of DCCA Modified Gel-Derived Silica", *Mat. Res. Soc. Symp. Proc.* vol. 32 (1984), Wallace et al.

"Sol-Gel Processing: Routes to oxide Ceramics Using Colloidal Dispersions of Hydrous Oxides and Alkoxide Intermediates", *Journal of Non-Crystalline Solids*, 63 (1984) 183-191, D. L. Segal.

*Primary Examiner*—Robert L. Stoll
*Assistant Examiner*—Daniel S. Metzmaier
*Attorney, Agent, or Firm*—Donna L. Seidel

[57] ABSTRACT

An alkoxysilane sol-gel composition and method for its production are disclosed whereby an alkoxysilane of the general formula $$Si(OR)_4$$

wherein R is an organic radical such as methyl, ethyl, propyl or butyl is hydrolyzed with an acid catalyst and the resulting acidic sol is further hydrolyzed and condensed in the presence of an alkaline component which accelerates gelation to form an inorganic oxide network.

8 Claims, No Drawings

GEL PROMOTERS FOR SILICA SOLS

FIELD OF THE INVENTION

The present invention relates generally to sol-gel compositions, and more particularly to gel promoters for acid-catalyzed sol-gel compositions.

BACKGROUND

U.S. Pat. No. 4,166,753 to Emblem et al discloses a method of producing a usefully gellable cohydrolysate from a normally gellable substance and a not normally gellable substance, preferably a hydrous oxide which has an alkoxy group implanted on it. When hydrolysis is carried out under acid conditions, a slurry is formed from hydrolysate and powdered refractory material which may be set by adding an alkaline reagent.

U.S. Pat. No. 4,197,230 to Baney et al discloses that abrasion resistant siloxane resins having a low degree of organic substitution, thereby tending to be brittle, can be made flexible by including some degree of phenyl substitution. Buffered latent condensation catalysts are disclosed, such as amine carboxylates and quaternary ammonium carboxylates.

In "The Processing and Characterization of DCCA Modified Gel-Derived Silica", *Mat. Res. Soc. Symp. Proc.* Vol. 32 (1984), Wallace et al examine the role of formamide ($NH_2CHO$) as a drying control chemical additive to reduce drying stress in tetramethyl orthosilicate (TMS) gel-derived silica.

D. L. Segal discloses in "Sol-Gel Processing: Routes to Oxide Ceramics Using Colloidal Dispersions of Hydrous Oxides and Alkoxide Intermediates", *Journal of Non-Crystalline Solids*, 63 (1984) 183-191, that spheres may be formed from a hydrous oxide sol dispersed as liquid droplets in an immiscible organic solvent. In external gelation, removal of anion from the sol droplets by passing ammonia gas or adding a long-chain amine to the solvent results in gel formation.

SUMMARY OF THE INVENTION

The present invention provides a method for decreasing or controlling the gelation time of acid-catalyzed sols derived from alkoxysilanes. Gelation of stable, acidic sols can be induced by reaction of such sols with basic compositions such as an amino-functional silane or polysiloxane, an organic amine, ammonia vapor, a base-catalyzed silica sol, or an alkaline colloidal silica sol, or an anion exchange resin in hydroxide form.

DESCRIPTION OF THE PREFERRED EMBODIMENTS

An alkoxysilane of the general formula $$Si(OR)_4$$ 

wherein R is a low molecular weight alkyl radical such as methyl, ethyl, propyl or butyl is dissolved in an organic solvent, preferably an alcohol, most preferably a low molecular weight alcohol of the general formula ROH wherein R is the same low molecular weight alkyl group found in the alkoxysilane. The alkoxysilane in solution is then hydrolyzed with water according to the general reaction $$Si(OR)_4 + H_2O \rightarrow Si(OR)_{y-x}(OH)_x + xROH$$ 

Hydrolysis and condensation reactions are typically catalyzed by an acid, such as HCl or $HNO_3$, resulting in stable, acidic sols.

Gelation of such stable, acidic sols can be induced, in accordance with the present invention, to decrease or control the gelation time, by reaction of the sol with an alkaline agent such as an amino-functional silane or polysiloxane, a buffered organic amine, ammonia vapor, a base catalyzed silica sol derived from an alkoxysilane, an alkaline colloidal silica sol or an anion exchange resin in hydroxide form.

For example, a sol prepared from tetraethyl orthosilicate (TEOS) and phosphoric acid ($H_3PO_4$) and a sol prepared from TEOS and monoethanolamine (MEA) are both stable and separately remain liquid for weeks. However, if the two sols are mixed together, a rigid, transparent gel is formed within hours. Similarly, silica sols ($SiO_2$) with a shelf life of 2 to 3 weeks will gel in less than a minute when treated with monoethanolamine or an organosilane ester such as γ-aminopropyltriethoxysilane.

Organic amines, aminosilanes, base-catalyzed silica sols derived from alkoxysilanes, alkaline colloidal silica sols or anion exchange resins in the hydroxide (OH) form can be used in accordance with the present invention to increase the pH of the sol with a proportionate reduction in the gel time without sacrificing homogeneity or optical clarity of the resulting intermediate dry gel or final densified gel-derived glass.

The basic gel-promoters of the present invention may be successfully used to decrease the gel time for a variety of acid-catalyzed sols such as $SiO_2$, $SiO_2/B_2O_3$, aqueous colloidal $SiO_2$ or $Al_2O_3$, $SiO_2$/silane, $SiO_2/P_2O_5$, $SiO_2/Al_2O_3/P_2O_5$, $SiO_2/Al_2O_3$ and acidic alkoxide-derived $SiO_2$ containing hydrophobic or hydrophilic fumed silica.

For example, a liquid silica-based binder prepared from tetraethylorthosilicate (TEOS) containing 19.6 percent $SiO_2$ with a shelf-life of greater than a year can be gelled in 1 minute, and the gelation of an aqueous $SiO_2/TiO_2/B_2O_3$ sol with a pH of 0.4 and an oxide ratio of 89/92/2 derived from tetraethylorthosilicate, tetrabutyl titanate and $B_2O_3$ is accelerated from more than 3 weeks to less than 1 minute. Clear homogeneous gels free of solid precipitates are formed, which undergo uniform shrinkage and expulsion of solvent with reduced cracking during drying.

The present invention will be further understood from the specific examples that follow.

EXAMPLE I

A sol is prepared by dissolving 32.96 grams of tetraethylorthosilicate (TEOS) in 32.93 grams of 2-propanol. The sol is heated to 58° C. A solution of 0.184 gram of 85 percent $H_3PO_4$ in 2.82 grams of water is added to catalyze the sol, which is kept at 58° to 60° C. for 1.5 hours. An additional 2.85 grams of water is added for a total of one equivalent, and the temperature is maintained for an additional hour. To 4.59 grams of the sol is added 0.08 gram of γ-aminopropyltrimethoxysilane. Uniform gelation begins almost immediately.

EXAMPLE II

A sol is formed by dissolving 32.96 grams (0.158 mole) of TEOS in 32.93 grams of 2-propanol, warming to 58° C., and hydrolyzing with 2 molar equivalents of water per mole of TEOS by first adding 2.82 grams of 1% aqueous phosphoric acid ($H_3PO_4$), stirring for 1.5 hours at 60° C., then adding another 2.85 grams of 1% H$_3$PO$_4$ with another hour of stirring at 60° C. before cooling the sol to room temperature. Without any gel promoter, the sol does not gel in more than 9 days.

A base-catalyzed polyalkoxysilane hydrolyzate sol gel-promoter is prepared by combining 60.05 grams (0.287 mole) of TEOS, 60.12 grams of 2-propanol and 6.13 grams of 0.01 percent monoethanolamine (MEA) in water, warming to 60° C. and stirring at 60° C. for 2 hours before cooling to ambient temperature. When 1 part by weight of the gel promoter is added to 2 parts by weight of the above acid-catalyzed sol, the gel time is reduced to 5 days. When equal parts by weight of the gel promoter and acid-catalyzed sol are combined, the gel time is reduced to 30 to 44 hours. When 2 parts by weight of the gel-promoter are added to 1 part by weight of the acid-catalyzed sol, the gel time is reduced to 18 hours.

EXAMPLE III

A silica sol is prepared by combining 175 grams (0.841 mole) of TEOS and 125 grams of 2-propanol, warming to 55° C. and adding 2.07 grams of concentrated nitric acid (HNO$_3$) in 151.44 grams (8.41 moles) of water. After stirring for 3 hours at 60° C., the sol is cooled to ambient temperature. Without treatment, the sol will gel in 12 to 14 days.

A gel promoter is prepared by dissolving γ-aminopropyltriethoxysilane in methanol to form a 10 percent solution. Adding 1.18 weight percent of the aminosilane to the acid-catalyzed sol reduces the gel time to 3 to 4 days. Adding 1.27 weight percent aminosilane reduces the gel time of the sol to 22 to 24 hours. Adding 1.32 weight percent of the aminosilane reduces the gel time of the sol to 4 minutes. Adding 1.42 weight percent of the aminosilane reduces the gel time of the sol to 2.5 minutes. Adding 1.46 weight percent of the aminosilane reduces the gel time of the sol to 2 minutes.

EXAMPLE IV

A silica sol is prepared as in the previous example. A basic colloidal silica sol comprising 40 percent SiO$_2$ and having a pH of 9.3 is used as the gel promoter. Using 12.5 weight percent of the basic colloidal silica sol reduces the gel time to 16 hours, while using 50 weight percent of the basic colloidal silica sol produces immediate gelation. In comparison, an acidic colloidal silica sol with a pH of 3.1 has no gel promoting effect.

EXAMPLE V

Thirty-three grams of the silica sol of the previous example is treated with 1.78 grams of anion exchange resin in hydroxide (OH) form. The particular resin used in this example is BioRad Analytical Grade Anion Exchange Resin AG 1-X8 (20 to 50 mesh). The sol and resin are stirred together at ambient temperature. The sol initially has a pH of 1.6 and gel time of 12 to 14 days. After 25 minutes of ion exchange, the pH of the sol is 5.75 and the gel time is 50 minutes. After 28 minutes of ion exchange, the pH of the sol is 6.4 and the gel time 25 minutes. After 30 minutes of ion exchange, the pH of the sol is 6.5 and the gel time 7 minutes.

EXAMPLE VI

A vertical glass column measuring 25 centimeters in length and about 1 centimeter in diameter, with a stopcock at the lower end, is packed with 16.6 grams of the ion exchange resin of the previous example, and the column is flushed with 2-propanol. A 25 gram aliquot of the sol of the previous example is eluted through the column over a period of about 15 minutes. This procedure increases the pH of the sol to about 3.4 to 3.5, and reduces the gel time to less than 12 hours.

EXAMPLE VII

A solution is prepared by dissolving 175 grams of TEOS in 125 grams of 2-propanol and warming to 55° C. A solution of 2.04 grams of concentrated nitric acid in 13.59 grams of deionized water is added to the TEOS solution. After one hour of stirring, 25.5 grams of tetrabutyl orthotitanate is added, and stirring is continued for 30 minutes at 60° C. A solution of 10 grams of 2-propanol and 13.5 grams of deionized water is added, with stirring continued for another hour. Then 1.3 grams of boric oxide (B$_2$O$_3$) is added, and stirring at 60° C. continued until the boric acid is dissolved. The resulting sol does not gel for at least 3 weeks at ambient temperature. Adding 7.5 weight percent monoethanolamine produces immediate gelation.

EXAMPLE VIII

A silica/titania/boric oxide sol is prepared as in the previous example. To the sol is added 18.8 weight percent γ-aminopropyltriethoxysilane, available from Union Carbide as A1100 aminosilane. The gel time is reduced to 1 to 2 minutes.

EXAMPLE IX

A sol of SiO$_2$/TiO$_2$/B$_2$O$_3$ is prepared as in the previous example. To the sol is added 3.8 weight percent N(β-aminoethyl) γ-aminopropyltrimethoxysilane, available from Union Carbide as A1120 aminosilane. The gel time is reduced to 2 to 3 minutes.

EXAMPLE X

A silica/titania/boric oxide sol is prepared as in the previous example. Adding 0.9 weight percent of a 10 percent solution of tris(hydroxymethyl)aminomethane in water reduces the gel time to 1 to 3 hours.

The above examples are offered to illustrate the present invention for controlling the gel time of acid sols derived from alkoxysilanes by using organic amines, preferably alkanolamines, aminosilanes, base-catalyzed sols derived from alkoxysilanes, alkaline colloidal silica sols, and anion exchange resins to adjust the pH of the sol to reduce the gel time without sacrificing homogeneity or optical clarity of the resulting intermediate dried gel or ultimate densified gel-derived glass. Clear homogeneous gels free of solid particles may be obtained from a wide variety of acid-catalyzed sols such as SiO$_2$, SiO$_2$/B$_2$O$_3$, SiO$_2$/P$_2$O$_5$, SiO$_2$/Al$_2$O$_3$, SiO$_2$/Al$_2$O$_3$/P$_2$O$_5$, Al$_2$O$_3$, SiO$_2$/TiO$_2$/B$_2$O$_3$, and the like. The presence of additional silanes or hydrophobic or hydrophilic fumed silica does not interfere with the basic gel promoters of the present invention. Various organic amines, aminosilanes, base-catalyzed sols, alkaline colloidal sols, ammonium compounds, ion exchange resins and ammonia vapor may be used in appropriate amounts to increase the pH of an acid-catalyzed sol and reduce its gel-time without precipitation in accordance with the present invention, the scope of which is defined by the following claims.

We claim:

1. A method of making an alkoxysilane composition comprising the steps of:

a. dissolving in an organic solvent an alkoxysilane of the general formula Si(OR)$_4$ wherein R is a low molecular weight alkyl group;
b. partially hydrolyzing said alkoxysilane in the presence of an acid catalyst to form an acidic sol; and
c. adding to said acidic sol an alkaline component selected from the group consisting of amino-functional silane, buffered organic amine, base-catalyzed silica sol, alkaline colloidal silica sol, and anion exchange resin in hydroxide form which accelerates gelation of said acidic sol to form a gel.

2. A method according to claim 1, wherein the amino-functional silane is an aminoalkyltrialkoxysilane.

3. A method according to claim 2, wherein the amino-functional silane is γ-aminopropyltrimethoxysilane.

4. A method according to claim 2, wherein the amino-functional silane is γ-aminopropyltriethoxysilane.

5. A method according to claim 1, wherein said alkaline component comprises a buffered organic amine.

6. A method according to claim 1, wherein said alkaline component comprises a base-catalyzed silica sol.

7. A method according to claim 1, where said alkaline component comprises an alkaline colloidal silica sol.

8. A method according to claim 1, wherein said alkaline component comprises an anion exchange resin in hydroxide form.

* * * * *